United States Patent
Dorsett et al.

(10) Patent No.: US 10,919,307 B2
(45) Date of Patent: Feb. 16, 2021

(54) RELATING TO INKJET PRINTERS

(71) Applicant: Domino UK Limited, Cambridge (GB)

(72) Inventors: Gregory William Dorsett, Cambridge (GB); Steven Geoffrey Luke, Cambridge (GB); Christopher Malcolm Potter, Cambridge (GB)

(73) Assignee: Domino UK Limited

( * ) Notice: Subject to any disclaimer, the term of this patent is extended or adjusted under 35 U.S.C. 154(b) by 0 days.

(21) Appl. No.: 16/341,544

(22) PCT Filed: Oct. 16, 2017

(86) PCT No.: PCT/GB2017/053121
§ 371 (c)(1),
(2) Date: Apr. 12, 2019

(87) PCT Pub. No.: WO2018/069734
PCT Pub. Date: Apr. 19, 2018

(65) Prior Publication Data
US 2019/0366729 A1 Dec. 5, 2019

(30) Foreign Application Priority Data
Oct. 14, 2016 (GB) ..................................... 1617488

(51) Int. Cl.
*B41J 2/175* (2006.01)
*G01F 23/26* (2006.01)

(52) U.S. Cl.
CPC ....... *B41J 2/17566* (2013.01); *B41J 2/17546* (2013.01); *G01F 23/268* (2013.01)

(58) Field of Classification Search
CPC .. B41J 29/393; B41J 2/17566; B41J 2/17546; B41J 2002/17579; B41J 2/1752; B41J 2/17526; B41J 2/1753; B41J 2/17543; B41J 2/17503; G01F 23/263; G01F 23/268
See application file for complete search history.

(56) References Cited

U.S. PATENT DOCUMENTS

| 6,097,405 A * | 8/2000 | Lo ......................... B41J 2/17546 347/6 |
| 6,490,920 B1 | 12/2002 | Netzer |
| 10,151,616 B1 * | 12/2018 | Otagaki ................. G01F 23/265 |
| 2005/0172712 A1 * | 8/2005 | Nyce ..................... G01F 23/263 73/304 C |
| 2008/0231290 A1 | 9/2008 | Zhitomirsky |
| 2012/0001867 A1 * | 1/2012 | Kawaguchi ............. G06F 3/044 345/174 |
| 2013/0276533 A1 | 10/2013 | Wilder et al. |
| 2014/0022292 A1 * | 1/2014 | Jones ................... B41J 2/17566 347/7 |

(Continued)

FOREIGN PATENT DOCUMENTS

EP  1845347 A2  10/2007
EP  2640577 B1  7/2015

*Primary Examiner* — Julian D Huffman
(74) *Attorney, Agent, or Firm* — Price Heneveld LLP

(57) ABSTRACT

The invention describes a facility to provide an indication of level in a container of conductive liquid used in an inkjet printer. The facility comprises an array of nested capacitive sensor pads, the outputs of which can be processed to provide a continuous indication of level. The outputs can also be processed to provide an indication of whether the container is mis-aligned on the printer.

9 Claims, 4 Drawing Sheets

(56) References Cited

U.S. PATENT DOCUMENTS

| | | | |
|---|---|---|---|
| 2015/0253174 A1* | 9/2015 | Barrett | G01F 23/263 |
| | | | 73/304 C |
| 2017/0119970 A1* | 5/2017 | Bammer | A61M 5/24 |
| 2018/0023993 A1* | 1/2018 | Philipson | G01F 23/266 |
| | | | 73/304 C |
| 2019/0376830 A1* | 12/2019 | Park | G01F 23/268 |

* cited by examiner

RELATING TO INKJET PRINTERS

FIELD OF THE INVENTION

This invention relates to inkjet printers and more particularly to means for determining the level of liquid in a container forming part of an inkjet printer and/or means for determining the correct alignment of such a container when positioned on a printer.

BACKGROUND TO THE INVENTION

Many continuous inkjet printers make use of a service module that, for convenience, attaches to the printing system in a way that is designed to reduce time, complexity and the possibility of ink spillage. Typically a service module contains an ink reservoir, ink and one or more filters, and may include other components that need to be changed according to a maintenance schedule throughout the life of the printer. The service module is conveniently attached to the ink circuit of the printer through a number of non-drip or low-drip valves, a part of each valve being incorporated in the service module and a complimentary part of each valve being incorporated in a manifold to which the service module connects. One problem with connecting such a service module is that a slight misalignment between any of the valve parts may result in a leak.

In use the ink service module contains a working volume of printing ink that is depleted as the ink is deposited on the substrate. The service module ink level is maintained by addition of ink from an ink cartridge or bottle that is generally mounted above the service module.

A means for measuring the level of ink in the service module is required so that it is known when the ink bottle is empty and needs to be replaced. If the ink level is allowed to get too low, air may be drawn into the system, potentially damaging the pump and other components. If this condition is sensed the printer normally shuts down the ink system protect the components.

In order to reduce the cost and complexity of the service module it is advantageous to provide a facility for sensing the ink level in a service module, which lies outside and is separate from the service module. Such a facility, using capacitance to indicate level, is described in EP 2,640,577 but this system has the disadvantage that it only provides indications of level in discrete steps and at fairly low resolution.

It is an object of the present invention to address one or more of the drawbacks outlined above; or at least provide a novel and useful alternative.

SUMMARY OF THE INVENTION

Accordingly, in a first aspect, the invention provides a method of determining the level of a conductive liquid in a container of an inkjet printer including the steps of:

providing a plurality of sensors of substantially identical surface area and arranged so that a horizontal line passes through two adjacent sensors such that a greater surface area of one sensor lies to one side of said horizontal line while a greater surface area of a second sensor lies to the opposite side of said horizontal line;

measuring a capacitance associated with each sensor; and deriving from the capacitance associated with each sensor a continuous characteristic from which said level may be deduced.

Preferably providing the plurality of sensors comprises providing at least three sensors.

Preferably the sensors are arranged such that each sensor forms one of at least one pair of adjacent sensors and, in use of the sensors, for any horizontal plane passing through a pair of sensors, a majority of the surface area of one of the pair of sensors is above the plane and a majority of the surface area of the other of the pair of sensors is below the plane.

Preferably said level is deduced by identifying a maximum gradient of said characteristic.

In a second aspect the invention provides a liquid level measuring facility for use with a container for an inkjet printer, the liquid level measuring facility including a plurality of sensors of substantially identical surface area and arranged so that a horizontal line passes through two adjacent sensors and such that a majority of the area of one sensor is arranged to one side of said horizontal line while a majority of the area of a second sensor is arranged to the opposite side of said horizontal line;

and a processing facility operable to measure a capacitance associated with each sensor and to derive from the capacitance associated with each sensor a continuous characteristic from which a level of liquid in said container may be deduced.

Preferably the processing facility is operable to deduce the liquid level in the container by identifying a maximum gradient of the characteristic.

Preferably the liquid level measuring facility includes at least three sensors.

Preferably the sensors are arranged such that each sensor forms one of at least one pair of adjacent sensors and, in use of the sensors, for any horizontal plane passing through a pair of sensors, a majority of the surface area of one of the pair of sensors is above the plane and a majority of the surface area of the other of the pair of sensors is below the plane.

Preferably said sensors are of substantially identical shape.

Preferably said shape is such that said sensors can be nested together.

Preferably, and more preferably still for each pair of sensors, a first edge of a first sensor is parallel to a juxtaposed second edge of a second sensor, said first and second edges being arranged in a generally lateral direction but at an angle to said horizontal line.

Preferably said first and second edges are defined by sides of a triangle.

Preferably said first and second edges are defined by sides of an isosceles triangle.

Preferably the sides of said isosceles triangle are longer than the base thereof.

Said sensors may advantageously be arranged in an array having horizontal symmetry.

In a third aspect the invention provides alignment means for determining correct alignment of a liquid container for an inkjet printer, the alignment means comprising an array of at least three sensors of substantially equal surface area and arranged such that each sensor forms one of at least one of a pair of adjacent sensors and, in use of the alignment means, for any horizontal plane passing through a pair of sensors, a majority of the surface area of one of the pair of sensors is above the plane and a majority of the surface area of the other of the pair of sensors is below the plane; and processing means operable to measure a capacitance associated with each sensor, to produce a continuous characteristic derived from the capacitances associated with the sensors, to establish a residual value for each sensor, the residual value being the difference between the measured capacitance associated with the sensor and a value of the continuous characteristic for the sensor, and to deduce from the residual values whether the liquid container is correctly aligned.

In a fourth aspect the invention provides a method of determining an alignment of a liquid container in an inkjet printer including the steps of:

providing an array of at least three sensors of substantially identical surface area and arranged so that each sensor forms one of at least one pair of adjacent sensors and, in use of the sensors, a horizontal line passes through two adjacent sensors such that a greater surface area of one sensor lies to one side of said horizontal line while a greater surface area of a second sensor lies to the opposite side of said horizontal line;

measuring a capacitance associated with each sensor;

producing a continuous characteristic derived from the capacitances associated with the sensors in said array;

establishing for each sensor a residual value, the residual value being the difference between the measured capacitance associated with the sensor and a value of the continuous characteristic for the sensor; and deducing from said residual values whether the liquid container is correctly aligned.

Preferably sensors having a greater surface area to one side of a vertical centre line are defined as odd sensors and sensors having greater surface area to the opposite side of said vertical centre line are defined as even sensors, said method comprising comparing the residuals from the odd sensors to the residuals of the even sensors to deduce if the container is horizontally mis-aligned.

Preferably sensors to one side of a horizontal centre line or line of horizontal symmetry are defined as upper sensors and sensors to the opposite side of said horizontal centre line or line of horizontal symmetry are defined as lower sensors, said method comprising comparing the residuals from the upper sensors to the residuals of the lower sensors to deduce if the container is vertically mis-aligned.

In a fifth aspect the invention provides an inkjet printer including the liquid level measuring facility and/or alignment means as set forth above.

Preferably said inkjet printer comprises a continuous inkjet printer.

Many variations in the way the present invention can be performed will present themselves to those skilled in the art. The description which follows is intended as an illustration only of one means of performing the invention and the lack of description of variants or equivalents should not be regarded as limiting. Wherever possible, a description of a specific element should be deemed to include any and all equivalents thereof whether in existence now or in the future.

BRIEF DESCRIPTION OF THE DRAWINGS

The various aspects of the invention will now be described with reference to the accompanying drawings in which.

DESCRIPTION OF WORKING EMBODIMENTS

Figure 1:
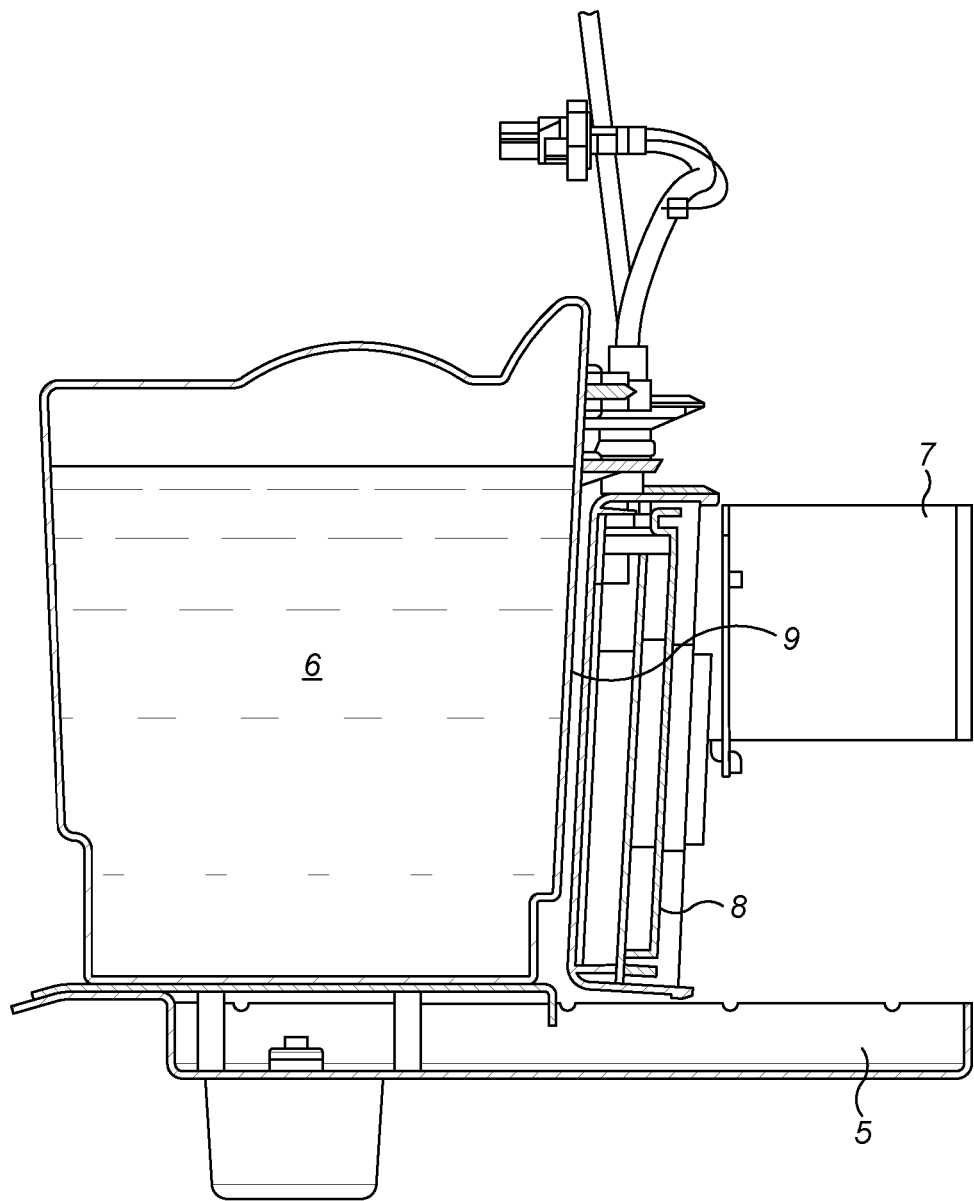
FIG. 1: shows an elevational view of part of an inkjet printer and including a level sensor and ink service module.

Referring to FIG. 1, the invention provides a method and apparatus for determining liquid levels in a liquid reservoir in an inkjet printer. The invention has been developed particularly to monitor liquid ink level in the service module of a continuous inkjet printer and the embodiment described below applies to such an application. However it will be appreciated that the invention could also be applied to the make-up reservoir of a continuous inkjet printer and, indeed, to any liquid container used in any form of inkjet printer.

As illustrated in FIG. 1, an ink service module 6 is mounted on or in the chassis 5 of a continuous inkjet printer and is connected to the ink circulation system of the printer through a manifold (not shown) by a number of valves (not shown). This arrangement will be readily familiar to those skilled in the art and is described in our European Patent No. 2 640 575. A pump 7 is incorporated in the ink circulation system and, in use, draws ink from the service module 6, circulates the ink, and returns unprinted ink to the service module 6. Also attached to the chassis 5 is a capacitive level measuring facility 8. This is mounted so as to be positioned next to or in contact with a vertically extending wall 9 of the service module 6, when the service module is correctly installed in the printer. The level measuring facility 8 may include a compliant mount so that the facility 8 aligns with the wall 9 when the service module 6 is inserted into the printer.

Figure 2:
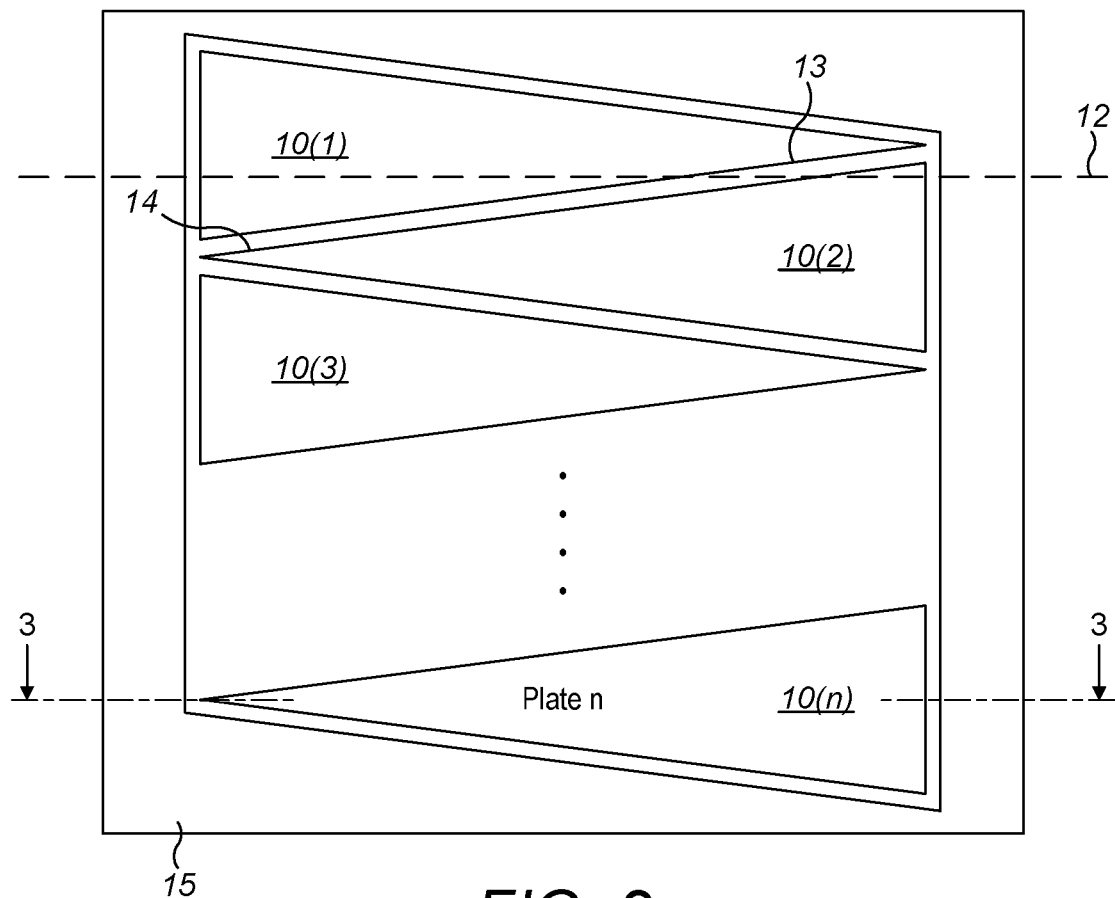
FIG. 2: shows part of an array of sensors used in level sensing apparatus according to the invention.
Figure 3:
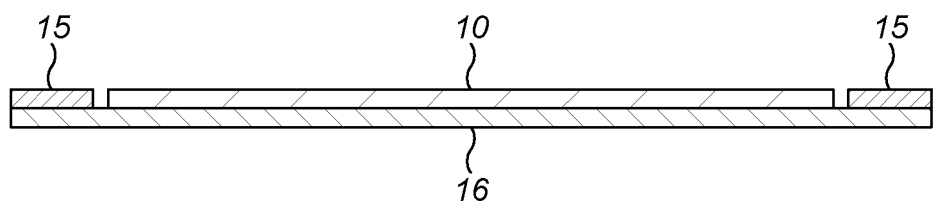
FIG. 3: shows a cross-section along the line axis 3-3 in FIG. 2.
Figure 4:
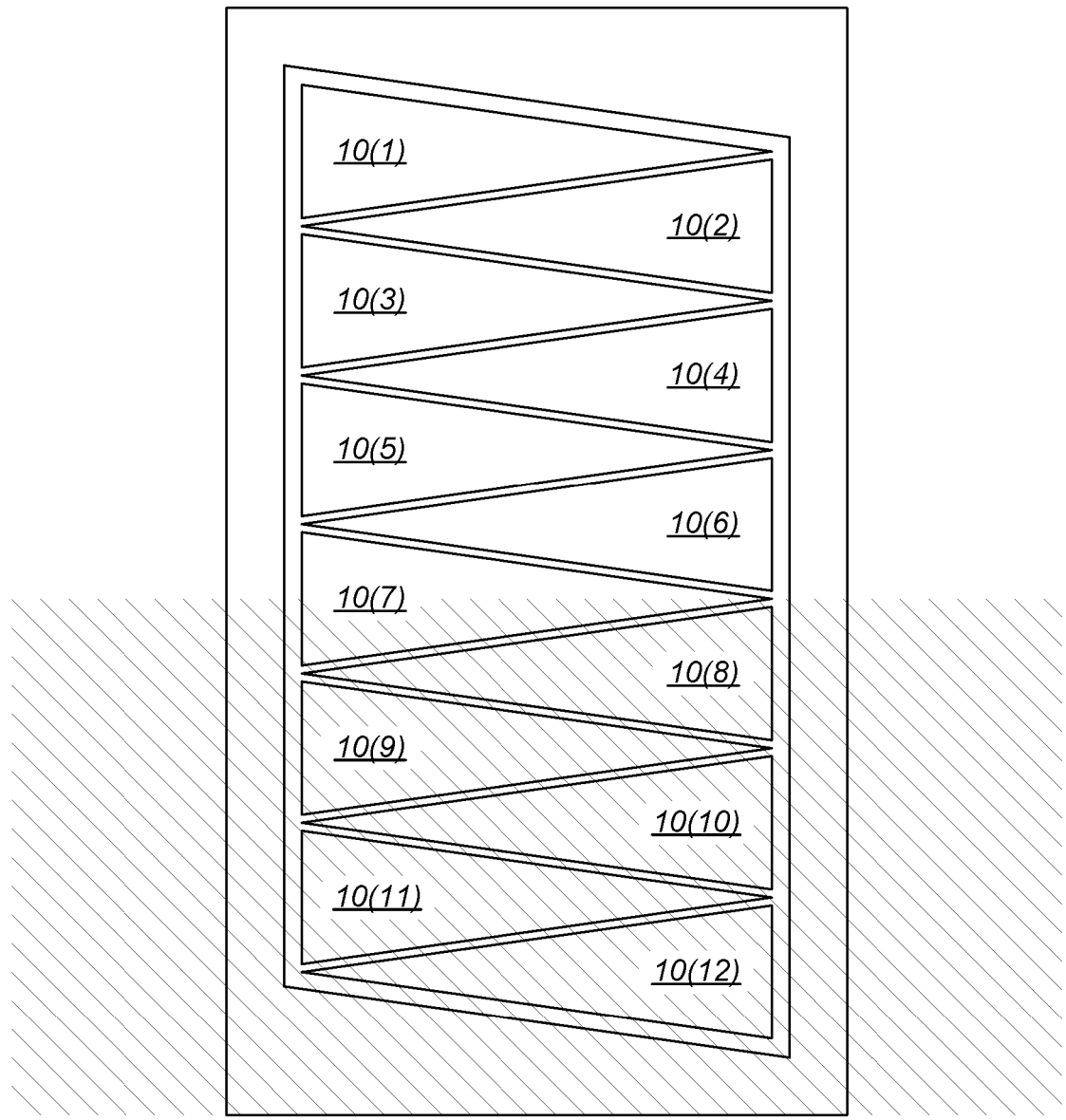
FIG. 4: shows a schematic view of a sensor array according to the invention and a liquid whose surface position is being determined.

Referring now to FIGS. 2 to 4, an important feature of the invention is the design of the capacitive sensor pads 10 which form part of the level measuring facility 8. As is illustrated the pads 10 are provided in a vertical array of twelve pads but it will be apparent that an odd number of pads would be required for horizontal symmetry of the pads. The pads 10 must be of the same surface area and it is convenient to make them of identical shape. Adjacent pads are arranged so a horizontal line passes through two pads in any particular vertical position but that the area of one pad on one side of the line differs from the area of the adjacent pad on that side of the line. This is illustrated in FIG. 2 where horizontal line 12 passes through adjacent pads 10(1) and 10(2). It can be seen that the larger part of the surface area of pad 10(1) is above the line 12 while only a small part of pad 10(2) is positioned above the line. The situation is reversed below the line where the larger part of pad 10(2) is positioned together with the minor part of pad 10(1). The relevance of this will become apparent from the description that follows.

So that two adjacent sensor pads can straddle a common horizontal line, a first pad, say 10(1) has a first edge 13 that extends generally laterally but at an angle to the horizontal and a second pad 10(2) has a second edge 14 that is parallel and juxtaposed to the edge 13. The edges 13 and 14 are preferably defined by edges of a triangle and, more preferably, by longer edges of an isosceles triangle. Forming the pads as isosceles triangles then allows adjacent pads to be reversed and the pads nested together into a compact vertical array having both vertical and horizontal centre lines.

The array of pads 10(1) . . . 10(12) is surrounded on all sides by a reference electrode 15, and the reverse of the sensor is also covered with a shield electrode 16 that matches the external perimeter of the reference electrode.

The sensor array is connected to an integrated capacitance digital converter (CDC) such as the Analog Devices AD7147. Such devices are normally used to interpret the sensor attached to capacitive touchscreens, which is aimed at detecting the position of fingers. As the detection of fingers is a somewhat different application to the detection of a continuous liquid level reading, the CDC is connected to a microcontroller so that the CDC output signal can be processed. The CDC drives the sensor pads 10 with a square wave at high frequency. It also drives the reference electrode 15 surrounding the pads and the shield electrode 16 at the same frequency. As all of the electrodes are driven with the same signal and in phase there should be no capacitance between them. The shield electrode 16 ensures that there are no stray capacitances between the sensor pads 10 and other conductors in the printer. Measurements from each pad 10 are processed as the difference between the individual pad reading and the reference electrode.

When a container with liquid is placed adjacent to the sensor, there is a change in capacitance for all of the sensing pads. Using the example shown in FIG. 4, where the liquid container is about half-full and the sensing facility comprises an array of 12 pads, it can be seen that the horizontal plane corresponding to the liquid level passes through the mid-height of sensor pad 10(7). Pads 10(8) to 10(12) will form a capacitor directly with the liquid (the container wall forming the dielectric) and, as the liquid is conductive, it acts as the earthed electrode. Pad 10(7) is part covered and pads 10(1) to 10(6) are uncovered. It will be apparent that, because the sensors are located on the outside of the container, references to "covered", to "part covered" and "uncovered" pads mean that a horizontal plane corresponding to the liquid surface passes, respectively, above, through and below those pads. The capacitance between pads 10(9) to 10(12), and the ink, is approximately equal and at a high level; pad 10(8) is just covered and might have a slightly lower associated capacitance value than pads 10(9) to 10(12), whereas the capacitance associated with pad 10(7) will be approximately half of that of pads 10(9) to 10(12). Pad 10(6) will have some capacitance between itself and the surface of the liquid in the reservoir and pads 10(1) to 10(5) will have diminishing amounts of associated capacitance depending on the distance between the sensing pad and the surface of the liquid.

As the liquid level continues to rise, the capacitance associated with pad 10(7) will also increase and pad 10(6) will also give some capacitance directly from the liquid as the liquid rises to the level of that pad.

Figure 5:
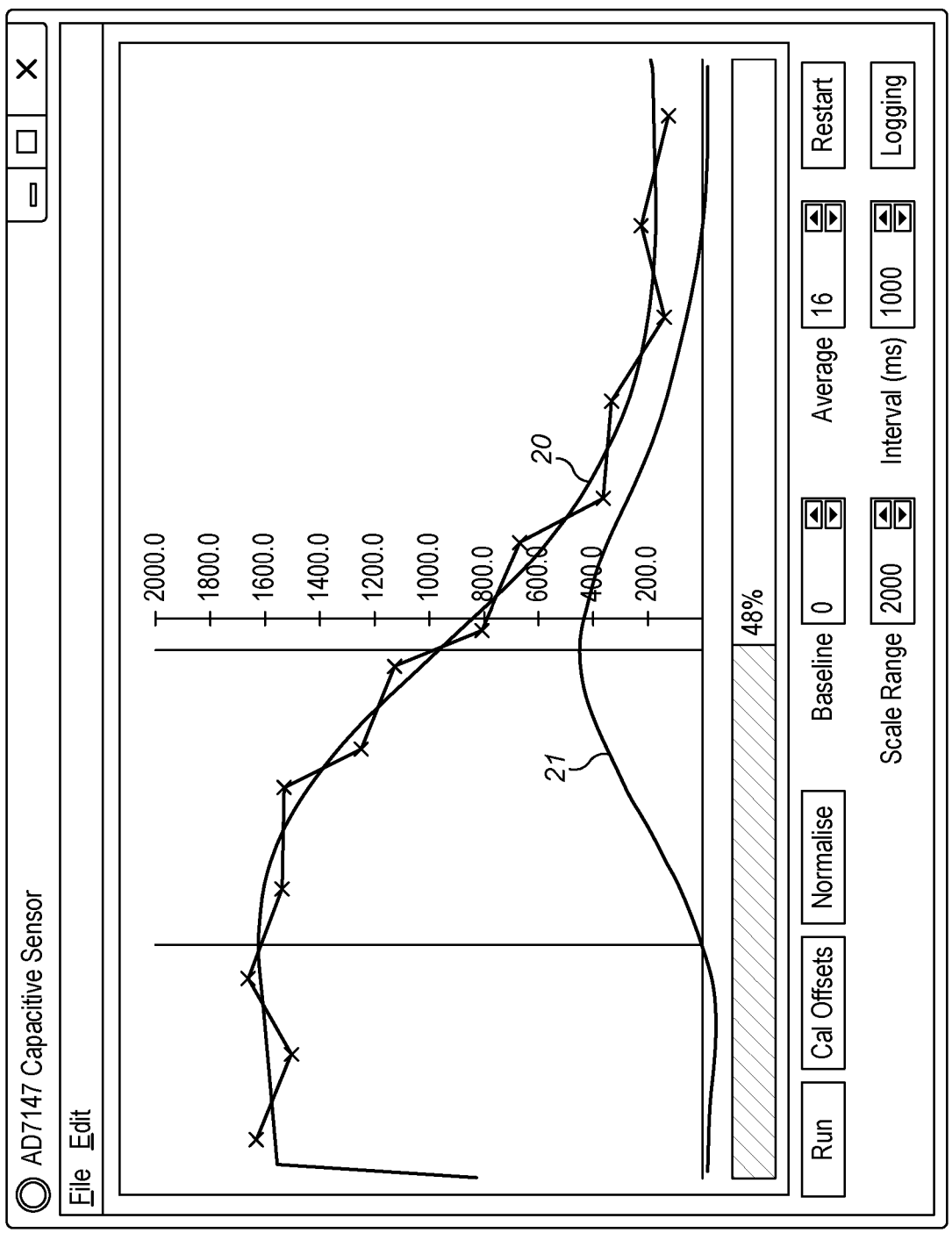
FIG. 5: shows raw signal outputs derived from the individual sensors superimposed on a post-processing, smooth signal, and the differential of that signal.

The capacitances associated with the individual sensors, when the liquid level is about halfway up the container, are shown as crosses in FIG. 5. These are combined and fitted with a cubic spline, shown as curve 20 in the Figure. This shows a characteristic at least indicative of the capacitive response of the different pads against pad position. The cubic spline may be differentiated to give curve 21 and the maximum slope is interpreted as the level of the liquid, as this represents the point where a pad is in line with the liquid level and has a strong capacitance and the next pad, which is not in line with the liquid level, does not have a strong capacitance. As pads are partially in line with the ink as explained above, this method makes use of the overlap provided by the nested pads and gives an accurate and continuous indication of the liquid level.

It will also be noted from FIG. 5 that there is a regular scatter of the points around the cubic spline, with odd numbered pads reading above the line and even numbered pads below the line. The size and nature of the residuals provide the basis for the third and fourth aspects of the invention, in which the comparison of the residuals of a best fit line can allow the deduction of alignment of the level sensing facility with the fitted ink service module. When even numbered pad readings are lower than odd numbered pad readings it indicates that the reservoir is closer to the side of the array which is occupied by the bases of the odd numbered sensing pads, and further away from the even numbered side.

Similarly, if there is misalignment from top to bottom then the first few pads will give a higher than normal reading and the last few pads a lower than normal reading, or vice versa depending on the nature of mis-alignment. That is, the magnitudes of the residuals will be greater for the first few pads than for the last few pads, or vice versa.

This measurement observation can be put to use in ensuring that a service module filled with ink is correctly aligned before the pump 7 is activated in the ink system, which would lead potentially to ink leaking from the valve connections by which the service module is fitted to the ink manifold.

Accordingly, on start up, the printer first takes readings from the level sensing facility. The readings are fitted with a cubic spline and a check is performed to compare the signs of the residuals of the odd and even pads. If the signs of the residuals of the odd and even pads are opposite, then the printer deduces that there is a horizontal misalignment. The magnitudes of the residuals are then compared to a predetermined threshold below which it has been empirically determined that the system does not leak. If the magnitudes of the residuals are above this level, then the printer will not start and will issue a warning to the user that the service module is horizontally misaligned and needs to be reconnected.

Similarly, the magnitude of the readings when the service module is full or nearly full is compared across the array. If the deviation in readings is greater than a predetermined threshold, then the printer will also indicate that the service module is vertically misaligned and needs to be reconnected.

The invention claimed is:

1. An alignment device for determining correct alignment of a liquid container for an inkjet printer, the alignment device comprising an array of at least three sensors of substantially equal surface area and arranged such that each sensor forms one of at least one pair of adjacent sensors and, in use of the alignment device, for any horizontal plane passing through a pair of sensors, a majority of the surface area of one of the pair of sensors is above the plane and a majority of the surface area of the other of the pair of sensors is below the plane; and a processor operable to measure a capacitance associated with each sensor, to produce a continuous characteristic derived from the capacitances associated with the sensors, to establish a residual value for each sensor, the residual value being the difference between the measured capacitance associated with the sensor and a value of the continuous characteristic for the sensor, and to deduce from the residual values whether the liquid container is correctly aligned.

2. An inkjet printer including the alignment device of claim 1.

3. An inkjet printer as claimed in claim 2, comprising a continuous inkjet printer.

4. A method of determining an alignment of a liquid container in an inkjet printer including the steps of:

providing an array of at least three sensors of substantially identical surface area and arranged so that each sensor forms one of at least one pair of adjacent sensors and, in use of the sensors, a horizontal line passes through two adjacent sensors such that a greater surface area of one sensor lies to one side of said horizontal line while a greater surface area of a second sensor lies to the opposite side of said horizontal line;

measuring a capacitance associated with each sensor;

producing a continuous characteristic derived from the capacitances associated with the sensors in said array;

establishing for each sensor a residual value, the residual value being the difference between the measured capacitance associated with the sensor and a value of the continuous characteristic for the sensor; and deducing from said residual values whether the liquid container is correctly aligned.

5. A method as claimed in claim 4 wherein sensors having a greater surface area to one side of a vertical centre line are defined as odd sensors, and sensors having greater surface area to the opposite side of said vertical centre line are defined as even sensors, said method comprising comparing the residuals from the odd sensors to the residuals of the even sensors to deduce if the container is horizontally mis-aligned.

6. A method as claimed in claim 5 wherein sensors to one side of a horizontal centre line or line of horizontal symmetry are defined as upper sensors, and sensors to the opposite side of said horizontal centre line or line of horizontal symmetry are defined as lower sensors, said method comprising comparing the residuals from the upper sensors to the residuals of the lower sensors to deduce if the container is vertically mis-aligned.

7. A method as claimed in claim 4 wherein sensors to one side of a horizontal centre line or line of horizontal symmetry are defined as upper sensors, and sensors to the opposite side of said horizontal centre line or line of horizontal symmetry are defined as lower sensors, said method comprising comparing the residuals from the upper sensors to the residuals of the lower sensors to deduce if the container is vertically mis-aligned.

8. An inkjet printer comprising:

a liquid level measuring facility for use with a container for the inkjet printer, the liquid level measuring facility including a plurality of sensors of substantially identical surface area and arranged so that a horizontal line passes through two adjacent sensors and such that a majority of the area of one sensor is arranged to one side of said horizontal line while a majority of the area of a second sensor is arranged to the opposite side of said horizontal line;

a processing facility operable to measure a capacitance associated with each sensor and to derive from the capacitance associated with each sensor a continuous characteristic from which a level of liquid in said container may be deduced, by identifying a maximum gradient of the characteristic;

an alignment device for determining correct alignment of a liquid container for the inkjet printer, the alignment device comprising an array of at least three sensors of substantially equal surface area and arranged such that each sensor forms one of at least one pair of adjacent sensors and, in use of the alignment device, for any horizontal plane passing through a pair of sensors, a majority of the surface area of one of the pair of sensors is above the plane and a majority of the surface area of the other of the pair of sensors is below the plane; and a processor operable to measure a capacitance associated with each sensor, to produce a continuous characteristic derived from the capacitances associated with the sensors, to establish a residual value for each sensor, the residual value being the difference between the measured capacitance associated with the sensor and a value of the continuous characteristic for the sensor, and to deduce from the residual values whether the liquid container is correctly aligned.

9. An inkjet printer as claimed in claim 8, comprising a continuous inkjet printer.

* * * * *